(12) United States Patent
Alexander et al.

(10) Patent No.: US 12,723,139 B2
(45) Date of Patent: Sep. 1, 2026

(54) POLYMERIC FILMS

(71) Applicants: SALTS HEALTHCARE LIMITED, Birmingham (GB); SWANSEA UNIVERSITY, Swansea (GB)

(72) Inventors: Shirin Alexander, Swansea (GB); Andrew Barron, Swansea (GB); Donald Hill, Swansea (GB); Lee Tretheway, Birmingham (GB); Iain Powner, Birmingham (GB)

(73) Assignees: SALTS HEALTHCARE LIMITED, Birmingham (GB); SWANSEA UNIVERSITY, Swansea (GB)

( * ) Notice: Subject to any disclaimer, the term of this patent is extended or adjusted under 35 U.S.C. 154(b) by 717 days.

(21) Appl. No.: 17/598,066

(22) PCT Filed: Mar. 25, 2020

(86) PCT No.: PCT/GB2020/050789
§ 371 (c)(1),
(2) Date: Sep. 24, 2021

(87) PCT Pub. No.: WO2020/201717
PCT Pub. Date: Oct. 8, 2020

(65) Prior Publication Data

US 2022/0177662 A1 Jun. 9, 2022

(30) Foreign Application Priority Data

Mar. 29, 2019 (GB) ..................................... 1904458

(51) Int. Cl.
*C08J 7/06* (2006.01)
*C01F 7/021* (2022.01)
*C08J 5/18* (2006.01)

(52) U.S. Cl.
CPC ................ *C08J 7/06* (2013.01); *C01F 7/021* (2013.01); *C08J 5/18* (2013.01); *C08J 2300/22* (2013.01)

(58) Field of Classification Search
CPC ..... C08J 7/06; C08J 5/18; C01F 7/021; C01F 7/02; B32B 2307/73; B32B 2250/05
See application file for complete search history.

(56) References Cited

U.S. PATENT DOCUMENTS 5,271,987 A 12/1993 Iskra
5,500,216 A * 3/1996 Julian .................... A61Q 17/00 424/78.03

(Continued)

FOREIGN PATENT DOCUMENTS

CN 102665618 A 9/2012
CN 105358322 A 2/2016

(Continued)

OTHER PUBLICATIONS

International Search Report and Written Opinion associated with International application No. PCT/GB2020/050790, issued May 29, 2020, 9 pages.

(Continued)

*Primary Examiner* — Michael M Dollinger
(74) *Attorney, Agent, or Firm* — Leydig, Voit & Mayer, Ltd.

(57) ABSTRACT

A polymeric film includes a substrate at least partially coated with hydrophobic particles, the hydrophobic particles include:

a metal oxide core; and a hydrocarbon chain having from 2 to 40 carbon atoms, wherein the hydrocarbon chain is chemically bound to the metal oxide core.

20 Claims, 2 Drawing Sheets

(56) References Cited

U.S. PATENT DOCUMENTS

| | | | | |
|---|---|---|---|---|
| 5,591,144 | A | 1/1997 | Smith et al. | |
| 5,855,571 | A | 1/1999 | Steger et al. | |
| 6,683,126 | B2 * | 1/2004 | Keller | C09D 7/69 524/588 |
| 8,598,406 | B2 | 12/2013 | Ponomarenko et al. | |
| 2001/0044378 | A1 | 11/2001 | Steer et al. | |
| 2002/0133225 | A1 | 9/2002 | Gordon | |
| 2003/0148684 | A1 | 8/2003 | Cramer et al. | |
| 2005/0008839 | A1 | 1/2005 | Cramer et al. | |
| 2005/0065485 | A1 | 3/2005 | Andersen et al. | |
| 2006/0159916 | A1 | 7/2006 | Dubrow et al. | |
| 2006/0258999 | A1 | 11/2006 | Ponomarenko et al. | |
| 2007/0003463 | A1 | 1/2007 | Ajiri | |
| 2008/0268233 | A1 | 10/2008 | Lawin et al. | |
| 2011/0008401 | A1 * | 1/2011 | Ranade | A61K 8/585 424/125 |
| 2011/0125114 | A1 | 5/2011 | Bekele | |
| 2012/0275009 | A1 * | 11/2012 | Vermeulen | G02B 26/004 427/535 |
| 2012/0308662 | A1 | 12/2012 | Konishi et al. | |
| 2012/0308823 | A1 | 12/2012 | Ajiri | |
| 2013/0081555 | A1 | 4/2013 | Li | |
| 2014/0330229 | A1 | 11/2014 | Lee | |
| 2015/0175317 | A1 | 6/2015 | Imai et al. | |
| 2015/0175814 | A1 | 6/2015 | Aizenberg et al. | |
| 2016/0075883 | A1 | 3/2016 | Ebert et al. | |
| 2016/0130487 | A1 * | 5/2016 | Iwamoto | C09K 3/18 428/36.4 |
| 2017/0015843 | A1 * | 1/2017 | Liu | C09D 183/04 |
| 2017/0189895 | A1 | 7/2017 | Hatakeyama et al. | |

FOREIGN PATENT DOCUMENTS

| | | | | |
|---|---|---|---|---|
| CN | 107189656 | A | 9/2017 | |
| CN | 109251345 | A | 1/2019 | |
| DE | 102014218355 | A1 | 3/2016 | |
| EP | 0593219 | A2 | 4/1994 | |
| EP | 2858492 | B1 | 4/2015 | |
| EP | 3017942 | B1 | 5/2016 | |
| GB | 2273052 | A | 6/1994 | |
| GB | 2510563 | A | 8/2014 | |
| GB | 2534012 | A | 7/2016 | |
| JP | 2008-266050 | A | 11/2008 | |
| JP | 2017/170739 | A | 9/2017 | |
| JP | 2018-192162 | A | 12/2018 | |
| WO | WO-2007029293 | A1 * | 3/2007 | B32B 27/08 |
| WO | WO 2012/173803 | A1 | 12/2012 | |
| WO | WO-2014019809 | A1 * | 2/2014 | C09D 183/04 |
| WO | WO 2014/192402 | A1 | 12/2014 | |
| WO | WO 2017/075333 | A1 | 5/2017 | |
| WO | WO 2018/041320 | A2 | 3/2018 | |
| WO | WO 2018/085376 | A2 | 5/2018 | |

OTHER PUBLICATIONS

International Search Report and Written Opinion associated with International application No. PCT/GB2020/050789, issued Jun. 16, 2020, 11 pages.

Al-Shatty et al. (Jun. 6, 2017) "Tunable Surface Properties of Aluminum Oxide Nanoparticles from Highly Hydrophobic to Highly Hydrophilic" *ACS Omega* 2(6):2507-2514; DOI: 10.1021/acsomega.7b00279.

Alexander et al. (Dec. 7, 2015) "Branched Hydrocarbon Low Surface Energy Materials for Superhydrophobic Derived Surfaces" *ACS Applied Materials & Interfaces* 8(1): 660-666; DOI: 10.1021/acsami.5b09784.

Ebert et al. (Jul. 5, 2012) Transparent, superhydrophobic, and wear-resistant coatings on glass and polymer substrates using SiO2, ZnO, and ITO nanoparticles. *Langmuir*. 28(31): 11391-11399. doi:10.1021/la301479c.

Haas et al. (Jan. 1, 2000) "Hybrid Inorganic-Organic Polymers Based on Organically Modified Si-Alkoxides" *Adv. Eng. Mater*. 2(9): 571-582; Retrieved from the Internet: URL:http://www3.interscience.wiley.com/cgi-bin/issn?DESCRIPTOR=PRINTISSN&VALUE=1438-1656.

Hill et al. (Jan. 30, 2020) "Controlling the wettability of plastic by thermally embedding coated aluminium oxide nanoparticles into the surface" *J Colloid Interface Sci*. 567: 45-53. doi:10.1016/j.jcis.2020.01.116.

Search Report under Section 17(5) by UK Intellectual Property Office issued Sep. 25, 2019 regarding Application No. GB1904455.1, 3 pages.

Search Report under Section 17(5) by UK Intellectual Property Office issued Nov. 29, 2019 regarding Application No. GB1904458.5, 5 pages.

Prontera et al. (Jul. 11, 2019) "Sustainable, Fluorine-Free, Low Cost and Easily Processable Materials for Hydrophobic Coatings on Flexible Plastic Substrates" *Materials* (*Basel*) 12(14): 2234 (11 pages). doi: 10.3390/ma12142234.

Examination Report under Section 18(3) by UK Intellectual Property Office issued May 9, 2022, regarding Application No. GB1904458.5, 2 pages.

Office Action with English Translation for JP Patent Application No. 2021-558526 issued Dec. 12, 2023, 4 pages.

European Patent Office Communication of a Notice of Opposition issued May 3, 2023, for European Patent No. 3946179, European Patent Application No. 20716885.7, 23 pages.

1$^{st}$ Office Action issued Nov. 16, 2022, for Chinese Patent Application No. 202080025833.7, 11 pages.

Evonik Industries AG, Product Information for AEROXIDE® TiO2 T 805, Jul. 2015, 2 pp.

Bauer et al. (2008) "Improved attachment of mesenchymal stem cells on super-hydrophobic TiO2 nanotubes" Acta Biomaterialia 4:1576-1582; https://doi.org/10.1016/j.actbio.2008.04.004.

Examination report for IN Patent Application No. 202127043136 issued Jan. 23, 2026, 7 pp.

Evonik Industries AG, Product Information for AEROSIL® R 805, Aug. 2013, 2 pp.

Evonik Industries AG, Product Information for AEROXIDE® Alu C 805, Aug. 2013, 2 pp.

* cited by examiner

POLYMERIC FILMS

CROSS-REFERENCE TO RELATED APPLICATIONS

This application is a U.S. National Stage Application filed under 35 U.S.C. § 371 of International Application No. PCT/GB2020/050789, filed Mar. 25, 2020, which claims the benefit of Great Britain Application No. 1904458.5, filed Mar. 29, 2019. Both of these applications are hereby incorporated by reference in their entireties.

FIELD

This specification relates to polymeric films and, in particular, to polymeric films that have a water contact angle (WCA) of approximately 140° or greater.

In some embodiments, the polymeric films have WCAs in excess of 150°. The polymeric films of the present invention are non-toxic, which means that they can be used in a wide range of applications, including food and liquid packaging.

BACKGROUND

Surfaces that are difficult to wet are known as hydrophobic surfaces. Such surfaces have a number of commercially important properties. For instance, surfaces that are difficult to wet can be non-stick, self-cleaning and/or resistant to contamination.

Hydrophobic materials are commonly used to form hydrophobic surfaces. Such hydrophobic materials typically include waxes, fluorinated polymers, e.g. polytetrafluoroethylene (PTFE), organosilanes, etc. For instance, silicones, siloxanes and various fluoro-acrylate polymers are the predominant materials used in formulations for water proofing fabric materials. The hydrophobic formulations are generally sprayed onto the surface of a fabric material and, after air curing or drying, provide effective water repellency to rain, moisture, as well as protection against various soils and stains.

However, known hydrophobic materials do not typically adhere well to all surfaces, particularly thermoplastic films.

Moreover, known hydrophobic materials often contain fluorine and these fluorine-containing hydrophobic materials can be toxic.

Accordingly, there is a need for improvement. In particular, there is a need for non-toxic hydrophobic materials which adhere well to surfaces such as thermoplastic films, thereby providing polymeric films that are difficult to wet, self-cleaning and/or resistant to contamination.

SUMMARY OF INVENTION

Embodiments of the present invention seek to provide polymeric films having WCAs of approximately 140° or greater, in which adhesion between the substrate and the hydrophobic particles is improved when compared to the prior art. Embodiments of the present invention also seek to provide polymeric films which are less toxic when compared to the prior art.

According to a first aspect of the invention, there is provided a polymeric film comprising a substrate at least partially coated with hydrophobic particles, the hydrophobic particles comprising:

a metal oxide core; and a hydrocarbon chain having from 2 to 40 carbon atoms, wherein the hydrocarbon chain is chemically bound to the metal oxide core.

The average diameter of the hydrophobic particles may be less than or equal to approximately 200 nm.

The average diameter of the hydrophobic particles may be less than or equal to approximately 50 nm, e.g. less than or equal to approximately 20 nm.

The average diameter of the hydrophobic particles may be from approximately 8 nm to approximately 20 nm, such as from approximately 8 nm to approximately 15 nm.

The metal oxide core may comprise one or a combination of aluminium oxide, iron oxide, zinc oxide, and silicon oxide.

The hydrocarbon chain may be aliphatic.

The hydrocarbon chain may be straight or branched.

The hydrocarbon chain may have from 2 to 32 carbons.

The hydrocarbon chain may have from 6 to 32 carbons, such as from 6 to 24 carbons.

The hydrocarbon chain may be covalently bound to the metal oxide core via a functional group, e.g. an anionic functional group.

The functional group may comprise any one or a combination of hydroxide, carboxylate, phosphonate, phosphinate, thiolate and thiocarboxylate.

The hydrophobic particles may be free from fluorine.

The substrate may comprise a thermoplastic film. For instance, the substrate may comprise any one or more of a polyolefin, vinyl polymer, polyester and polyacetal film.

The substrate may comprise a co-extruded bilayer or multilayer film. For instance, the co-extruded bilayer or multilayer film may comprise layers of any one or a combination of polyethylene (PE), polypropylene (PP), acetal, acrylic, polyamide, polyvinyl chloride (PVC), ethylene vinyl acetate (EVA), polyvinylidene chloride (PVDC), polystyrene (PS), acrylonitrile butadiene styrene (ABS) and polycarbonate (PC).

The hydrophobic particles may be deposited (e.g. sprayed) onto the substrate. For instance, the hydrophobic particles may be mixed with a carrier, such as a volatile solvent, and the resultant mixture may be sprayed onto the substrate. The mixture of the hydrophobic particles and the carrier may form a solution or suspension. The mixture may have a hydrophobic particle concentration of from approximately 0.5 wt % to approximately 20 wt %, such as from approximately 0.5 wt % to approximately 10 wt %, such as from approximately 0.5 wt % to approximately 5 wt %, e.g. 0.5 wt % or 1 wt % or 2 wt % or 3 wt % or 4 wt % or 5 wt %.

The hydrophobic particles may be at least partially embedded in the substrate.

The substrate may be heated to enable the hydrophobic particles to become at least partially embedded therein to form a hydrophobic three-dimensional surface. Embedding of the hydrophobic particles may be enhanced by physical means, such as by rolling the heated substrate between rollers. During processing, the volatile solvent (where used) naturally evaporates and as the substrate cools the hydrophobic particles remain bound to the substrate such that they are not removed by washing.

The temperature to which the substrate is heated will vary depending on the type of substrate being utilised. In general, the substrate is heated to a temperature at which it starts to deform plastically. It is to be appreciated that the skilled person will know this temperature or will be able to determine this temperature through basic experimentation. For the EVA/EVA/PVDC/EVA/EVA five layer co-extruded thermoplastic film utilised in the below examples, the plastics deformation temperature was between approximately 80° C. and approximately 90° C.

The hydrophobic particles and the substrate may be secured to one another by an adhesive, such as an epoxy resin. For instance, an adhesive may be deposited onto the substrate followed by the hydrophobic particles. Alternatively, the hydrophobic particles may be deposited onto the substrate followed by the adhesive. The hydrophobic particles may become at least partially embedded in the adhesive, which itself provides the bond between the substrate and the hydrophobic particles. When the adhesive is cured, the result is a polymeric film having a hydrophobic three-dimensional surface.

The hydrophobic particles and the adhesive may be mixed and the resultant mixture may be deposited onto the substrate.

Where the hydrophobic particles and the adhesive are mixed, the mass ratio of the hydrophobic particles and the adhesive may be from approximately 1.0:1.0 to approximately 2.0:1.0. Mass ratios of hydrophobic particles and adhesive in this range have been found to produce polymeric films having particularly good hydrophobic surfaces.

The hydrophobic particles or the hydrophobic particle/adhesive mixture may be sprayed onto the substrate using a carrier, e.g. a volatile solvent, as described previously.

In all methods of attaching the hydrophobic particles to the substrate it has been found that the WCAs are not adversely affected even after the polymeric film has been immersed in or exposed to a solvent. Such treatment may result in some of the hydrophobic particles becoming removed from the substrate but the removal has a negligible effect on the WCA.

The hydrophobicity of the polymeric film may be tuned at different regions across the surface thereof. By this it is meant that a first region of the polymeric film may have an associated first WCA measurement and a second region of the polymeric film may have an associated second WCA measurement which differs from the first WCA measurement.

Tuning the hydrophobicity of the polymeric film may be achieved in a number of ways. For instance, more layers of hydrophobic particles may be deposited at the first region than at the second region. Accordingly, the first region will typically have a higher WCA measurement than the second region.

Additionally or alternatively, a more concentrated mixture of hydrophobic particles may be deposited at the first region than at the second region. Accordingly, the first region will typically have a higher WCA measurement than the second region. The concentration of hydrophobic particles in the mixture may be adjusted by dilution with the solvent and/or a different species, e.g. a hydrophilic particle and/or an unfunctionalised metal oxide. Additionally or alternatively, different types of hydrophobic particles may be deposited at the respective first and second regions. Accordingly the first and second regions will typically have differing WCA measurements.

The present invention provides self-cleaning polymeric films and processes for producing self-cleaning polymeric films, where the polymeric films have a hydrophobic surface formed by securing hydrophobic particles to a substrate.

The methods of attaching the hydrophobic particles to the substrate result in a polymeric film having a three-dimensional surface structure which can achieve a WCA of approximately 140° or greater. Accordingly, polymeric films of the invention can offer improved self-cleaning properties and/or resistance to contamination.

According to a second aspect of the invention, there is provided use of a polymeric film according to the first aspect of the invention as a food packaging film.

According to a third aspect of the invention, there is provided a food or liquid packaging or container comprising a surface at least partially coated with a polymeric film according to the first aspect of the invention.

The surface of the food or liquid packaging or container may comprise metal, alloy, plastics, cardboard and/or glass.

According to a fourth aspect of the invention, there is provided a glass sheet at least partially coated with a polymeric film according to the first aspect of the invention.

The glass sheet may be used in a windscreen, e.g. a windscreen for a vehicle.

According to a fifth aspect of the invention, there is provided a plastics sheet at least partially coated with a polymeric film according to the first aspect of the invention.

According to a sixth aspect of the invention, there is provided a fabric sheet at least partially coated with a polymeric film according to the first aspect of the invention.

According to a seventh aspect of the invention, there is provided an article of clothing or footwear at least partially coated with a polymeric film according to the first aspect of the invention.

BRIEF DESCRIPTION OF THE FIGURES

Embodiments of the invention will now be described by way of example only with reference to the accompanying drawings, in which.

DESCRIPTION OF EMBODIMENTS

Figure 1:
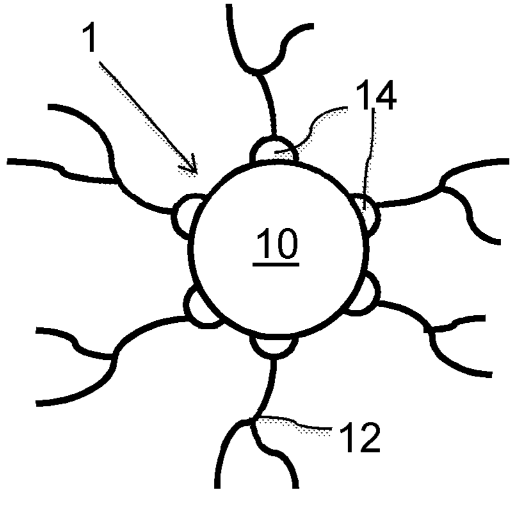
FIG. 1 is a representation of a hydrophobic particle.

Referring to FIG. 1 there is shown a hydrophobic particle, represented generally at 1. The hydrophobic particle 1 comprises a metal oxide core 10 and six hydrocarbon chains 12. It is to be appreciated that in other embodiments the hydrophobic particle 1 may have greater than or less than six hydrocarbon chains 12. Each hydrocarbon chain 12 has from 2 to 40 carbon atoms. The hydrocarbon chains 12 are branched, although they could be straight.

The hydrocarbon chains 12 are chemically bound to the metal oxide core 10. In some embodiments, the hydrocarbon chains 12 may be covalently bound to the metal oxide core 10 via a functional group 14. Suitable metal oxide cores 10 include aluminium oxide, iron oxide, zinc oxide, and silicon oxide.

The term "oxide" as used herein is intended to include oxide-hydroxides, hydroxides and also oxides having multiple metal oxidation states. For example, iron oxide may include $Fe_3O_4$ or $Fe_2O_3$ or a combination thereof.

In some embodiments, the hydrophobic particle 1 comprises a metal oxide core 10 having a hydrocarbon chain 12 covalently bound thereto by a carboxylate functional group 14. In other embodiments, alternative functional groups may be employed as long as a stable covalent interaction is formed between the metal oxide core 10 and the hydrocarbon chain 12. Alternative functional groups 14 may comprise any one or a combination of hydroxide, phosphonate, phosphinate, thiolate and thiocarboxylate.

In some embodiments, the hydrocarbon chain 12 may be aliphatic. In particular, the hydrocarbon chain 12 may be chosen from any suitable alkyl organic group as defined by the formula $C_xH_y$, where x and y are whole numbers and x is from 2 to 40. In some embodiments, the hydrocarbon chain 12 may have from 6 to 32 carbons, such as from 6 to 24 carbons.

In some embodiments, the hydrocarbon chain 12 may be straight. For instance, the hydrophobic particle 1 may be created by reaction of octanoic acid ($CH_3(CH_2)_6CO_2H$) with the metal oxide core 10.

In some embodiments, the hydrocarbon chain 12 may be branched. For instance, the hydrophobic particle 1 may be created by reaction of any one of isostearic acid ($CH_3(CH_2)_{16}COOH$) and 2-hexyldecanoic acid ($CH_3(CH_2)_7CH[(CH_2)_5CH_3]CO_2H$) with the metal oxide core 10.

Creation of the hydrocarbon chains 12 as described herein can provide the advantage that the resultant hydrophobic particles 1 are free from fluorine. This means that the hydrophobic particles 1 of the invention have environmental benefits in that they are less toxic when compared to prior art materials.

Figure 2:
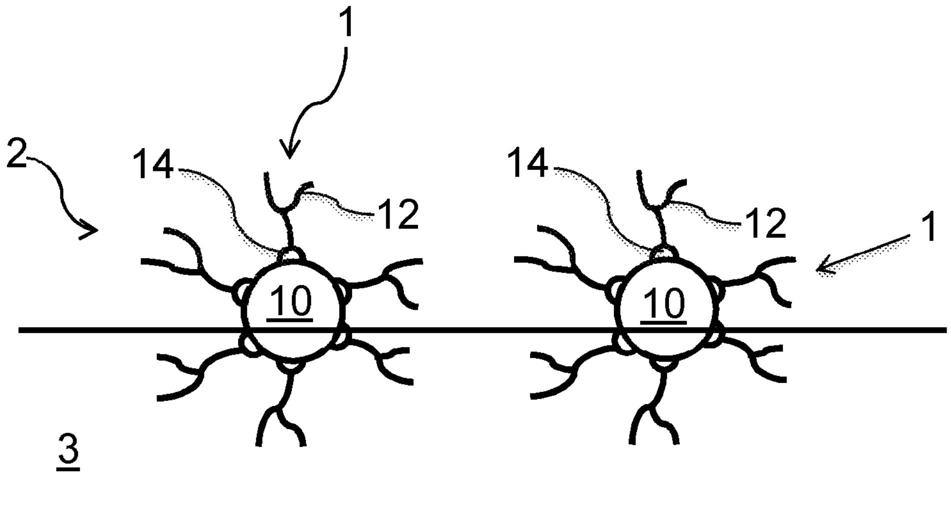
FIG. 2 shows a polymeric film according to an embodiment of the invention comprising a substrate having hydrophobic particles at least partially embedded therein.

Referring now to FIG. 2, there is shown a polymeric film, indicated generally at 2. The polymeric film 2 comprises a substrate 3 having the hydrophobic particles 1 at least partially embedded therein.

In some embodiments, the polymeric film 2 is prepared by depositing, e.g. spraying, the hydrophobic particles 1 onto a heated substrate 3. The hydrophobic particles 1 may be dissolved or suspended in a solvent. The exposed surface of the substrate 3 may be heated until it is softened, followed by deposition of the solution or suspension onto the softened surface. After allowing the solvent to evaporate and the substrate 3 to cool the hydrophobic particles 1 become at least partially embedded in the substrate 3. The result is a polymeric film 2 having a stable, textured and hydrophobic surface. In some embodiments, the substrate 3 may be heated by radiation (for example, by infra-red lamps) or by conduction (for example, by placing the substrate 3 on a hot plate or by exposing to heated air). It is to be understood that any method that provides sufficient heating to soften the substrate 3 without compromising its integrity may be employed.

The choice of solvent is limited only by the need for the solvent to evaporate from the surface of the substrate 3. Suitable solvents include, but are not limited to, isopropanol, toluene and ethanol.

Figure 3:
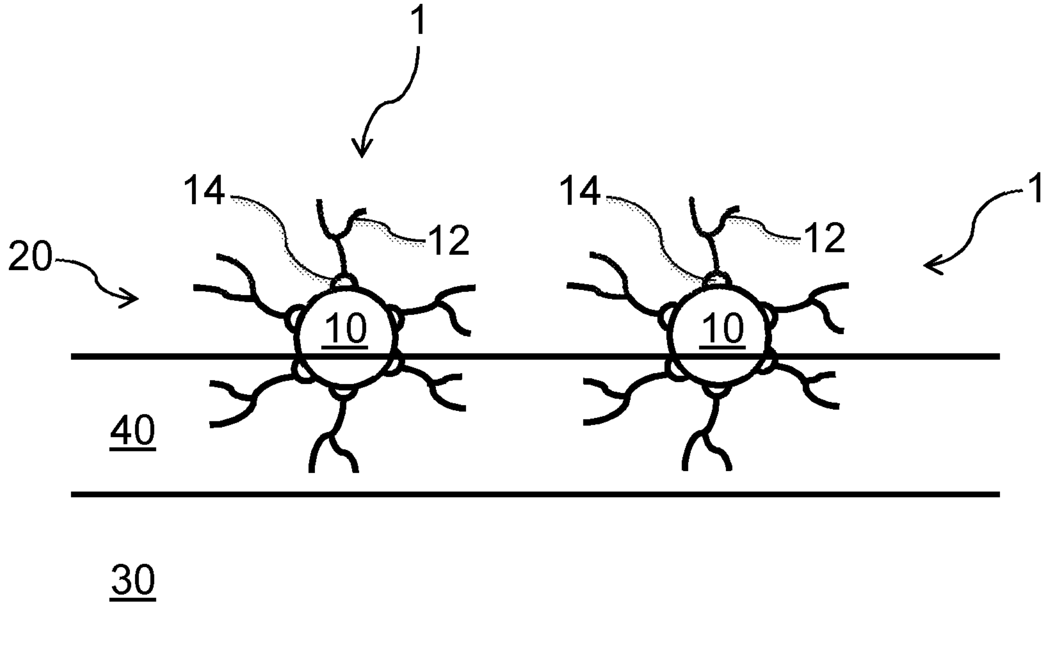
FIG. 3 shows a polymeric film according to an embodiment of the invention comprising a substrate and hydrophobic particles bonded thereto by an adhesive.

Referring now to FIG. 3, there is shown a polymeric film, indicated generally at 20. The polymeric film 20 comprises a substrate 30. The hydrophobic particles 1 are secured to the substrate 30 by an adhesive 40.

In some embodiments, the adhesive 40 may be an epoxy resin. The adhesive 40 may be applied to the substrate 30, followed by deposition of the solution or suspension containing the hydrophobic particles 1, or vice versa. The adhesive 40 is allowed to cure, at which point the hydrophobic particles 1 become bonded to the substrate 30 by virtue of being at least partially embedded in the adhesive 40.

In some embodiments, the hydrophobic particles 1 and the adhesive 40 may be mixed and the resultant mixture may be deposited, e.g. sprayed, onto the substrate 30.

Spraying may be effected by dissolving or suspending the mixture in a solvent and utilising a propellant or a compressor as is well known in the industry.

Materials

The substrate may comprise a thermoplastic film, e.g. a polyethylene copolymer. The substrate used for all of the subsequent experiments was an EVA/EVA/PVDC/EVA/EVA five layer co-extrusion having a thickness of 75 micron.

Aluminium oxide ($Al_2O_3$) particles having an average diameter of 13 nm were purchased from Sigma-Aldrich.

Iron oxide ($Fe_3O_4$) particles having an average diameter of from 15-20 nm were purchased from Sigma-Aldrich.

Isostearic acid was purchased from Nissan Chemical Industries and was used without further purification.

Toluene and isopropanol were supplied by VWR Chemicals.

SP106 Multi-Purpose Epoxy Resin System 1 kg Slow Hardener was purchased from MB Fibreglass.

Spraycraft Universal Airbrush Propellant was used for the spray coating and was purchased from Axminster Tools and Machinery.

Water Contact Angle (WCA) Measurements

WCA measurements were used to study the wettability of the polymeric films. WCA measurements were obtained by depositing 4 μL droplets of $H_2O$ onto the polymeric films. The values of the WCAs that are reported herein are the average of three measurements, recorded at different positions on the surfaces. Standard deviations are used to represent the uncertainties that are associated with these values.

Comparative Example 1

The WCA of the uncoated substrate (i.e. the clean EVA/EVA/PVDC/EVA/EVA five layer co-extruded film) was 88.3°±1.7°.

Comparative Example 2

The substrate was coated with unfunctionalised $Al_2O_3$ particles. Deposition of the unfunctionalised $Al_2O_3$ particles onto the substrate was achieved through spray coating from 2% wt isopropanolic suspensions at ambient temperature. Three sprays were used to try to achieve maximum coverage of the substrate by the unfunctionalised $Al_2O_3$ particles.

Coating the substrate with the unfunctionalised $Al_2O_3$ particles at ambient temperature resulted in the surface of the polymeric film becoming superhydrophilic. Accordingly, it was not possible to accurately measure the WCA of the resultant polymeric film.

Comparative Example 3

The substrate was coated with unfunctionalised $Fe_3O_4$ particles. Deposition of the unfunctionalised $Fe_3O_4$ particles onto the substrate was achieved through spray coating from 2% wt isopropanolic suspensions at ambient temperature. Three sprays were used to try to achieve maximum coverage of the substrate by the unfunctionalised $Fe_3O_4$ particles.

The WCA of the resultant polymeric film was 107.2°±3.4°.

Example 1

Functionalised aluminium oxide ($Al_2O_3$) particles were synthesised as follows. Aluminium oxide ($Al_2O_3$) particles (d=13 nm, 10.0 g, 98.0 mmol, 1.0 equiv.) were refluxed with isostearic acid (39.1 g, 137.3 mmol, 1.4 equiv.) in toluene (250 mL) for 24 hours. Once the reaction time had elapsed, the reaction mixture was collected and centrifuged at 5000 rpm for one hour. The solid was then recovered and centrifuged at 5000 rpm in isopropanol for one hour. Following this, the solid was centrifuged in ethanol at 5000 rpm for one hour three further times, and then dried at 80° C. for six hours.

The substrate was coated with the functionalised $Al_2O_3$ particles. Deposition of the functionalised $Al_2O_3$ particles onto the substrate was achieved through spray coating from 2% wt isopropanolic suspensions at ambient temperature. Three sprays were used to try to achieve maximum coverage of the substrate by the functionalised $Al_2O_3$ particles.

The WCA of the resultant polymeric film was 151.1°±1.0°.

Example 2

Functionalised iron oxide ($Fe_3O_4$) particles were synthesised as follows. Iron oxide ($Fe_3O_4$) particles (d=15-20 nm, 5.0 g, 21.6 mmol, 1.0 equiv.) were refluxed in toluene (100 mL) with isostearic acid (18.4 g, 64.7 mmol, 3.0 equiv.) for approximately twenty-four hours, under mechanical stirring. Once the reaction time had elapsed, the mixture was centrifuged at 5000 rpm for one hour. Following this, the solid was recovered and dried at 80° C. for six hours.

The substrate was coated with the functionalised $Fe_3O_4$ particles. Deposition of the functionalised $Fe_3O_4$ particles onto the substrate was achieved through spray coating from 2% wt isopropanolic suspensions at ambient temperature. Three sprays were used to try to achieve maximum coverage of the substrate by the functionalised $Fe_3O_4$ particles.

The WCA of the resultant polymeric film was 151.9°±2.1°.

Example 3

The substrate was heated and coated with the functionalised $Al_2O_3$ particles described in Example 1. The functionalised $Al_2O_3$ particles were spray coated onto the substrate once it had been softened as a result of heating. Heating of the substrate was accomplished as follows. First, the substrate was physically attached at its edges to the surface of a glass petri dish. The purpose of this was to secure the substrate in order to limit the extent to which it changed shape during the heating process. Heat was then applied to the petri dish until physical deformation of the substrate was observed. Once physical deformation of the substrate was observed, deposition of the functionalised $Al_2O_3$ particles onto the substrate was achieved through spray coating. The functionalised $Al_2O_3$ particles were spray coated from a 2.0% wt suspension. Five sprays were used to try to achieve maximum coverage of the substrate by the functionalised $Al_2O_3$ particles. Following each spray, the substrate was continually heated in order to accelerate the removal of the isopropanol. Further spray coating was performed on the substrate when no liquid was observed its surface. The temperature of the substrate was not measured prior to spray coating. However, it was observed that the substrate would start to deform plastically when heated to between 80-90° C.

The WCA of the resultant polymeric film was 142.0°±3.9°.

Although this value is slightly lower than when the functionalised $Al_2O_3$ particles were deposited onto the substrate at ambient temperature (Example 1), it is noteworthy that water droplets would readily roll off the polymeric film. Accordingly, this suggests that heating of the substrate during application of the hydrophobic particles does not overly detriment the desired hydrophobic nature of the resultant polymeric film.

In order to determine how well the functionalised $Al_2O_3$ hydrophobic particles bonded to the substrate the polymeric film was sonicated in isopropanol for approximately ten minutes and the WCA was retested.

Following sonication, the WCA of the polymeric film was 137.7°±7.9°. It is evident that the WCA did not change significantly following sonication which indicates a strong thermal embedding of the functionalised $Al_2O_3$ hydrophobic particles within the substrate.

Example 4

The substrate was heated and coated with the functionalised $Fe_3O_4$ particles described in Example 2 according to the method described in Example 3.

The WCA of the resultant polymeric film was 151.9°±2.7°.

In order to determine how well the functionalised $Fe_3O_4$ hydrophobic particles bonded to the substrate the polymeric film was sonicated in isopropanol for approximately ten minutes and the WCA was retested.

Following sonication, the WCA of the polymeric film was 90.3°±0.5°. This represents a WCA close to that of the uncoated substrate. This indicates that most of the functionalised $Fe_3O_4$ hydrophobic particles were removed by the sonication. Without being bound to any particular theory, it is understood that functionalised $Fe_3O_4$ hydrophobic particles form relatively large agglomerates on the substrate that are less strongly embedded than, say, functionalised $Al_2O_3$ hydrophobic particles. Accordingly, the functionalised $Fe_3O_4$ hydrophobic particles or more easily removed than the functionalised $Al_2O_3$ hydrophobic particles. However, that is not to say that embodiments incorporating functionalised $Fe_3O_4$ hydrophobic particles are not commercially viable. The sonication test merely seeks to replicate a highly destructive environment to determine the degree of bonding between the hydrophobic particles and the substrate. Hydrophobic films are unlikely to experience such a highly destructive environment in normal use.

Examples 5 to 9

Bonding of the functionalised $Al_2O_3$ particles and the substrate by an epoxy resin was studied in examples 5 to 9.

In example 5, 0.08 g of epoxy resin was added to 0.66 g of the functionalised $Al_2O_3$ particles described in Example 1 and suspended in 40 mL of isopropanol, such that the mass ratio of functionalised $Al_2O_3$ particles:epoxy resin was approximately 8.6:1.0. Deposition of the mixture onto the substrate was performed through spray coating at ambient temperature, as described previously. Spray coating this suspension onto the substrate resulted in a polymeric film having a WCA of 144.3°±4.3°.

In examples 6 to 9, the ratio of the functionalised $Al_2O_3$ particles and epoxy resin was adjusted.

The functionalised $Al_2O_3$ particle and epoxy resin ratios and the corresponding WCAs for the polymeric films of examples 5 to 9 are summarised in Table 1. Table 1 also shows the WCAs for the polymeric films after they have been sonicated in isopropanol for approximately ten minutes.

TABLE 1

Water contact angle (°) before and after sonication as a function of the ratio of functionalised $Al_2O_3$ particles and epoxy resin.

| Example | Functionalised $Al_2O_3$ particles:epoxy resin | Water contact angle (°) | Water contact angle (°) after sonication |
|---|---|---|---|
| 5 | 8.6:1.0 | 144.3 ± 4.3° | 132.2 ± 7.4° |
| 6 | 2.0:1.0 | 149.9 ± 1.1° | 137.1 ± 1.0° |
| 7 | 1.5:1.0 | 150.7 ± 1.2° | 135.9 ± 7.5° |
| 8 | 1.0:1.0 | 149.0 ± 7.8° | 141.1 ± 1.6° |
| 9 | 1.0:1.4 | 138.1 ± 10.4° | 142.0 ± 0.6° |

Whilst all of examples 5 to 9 achieved high WCAs, it is clear that polymeric films with the best hydrophobicity were created when the ratio of the functionalised $Al_2O_3$ particles and epoxy resin was from approximately 1.0:1.0 (i.e. 149.0±7.8°) to approximately 2.0:1.0 (i.e. 149.9±1.1°), e.g. 1.5:1.0 (i.e. 150.7±1.2°).

Moreover, as with Example 3, it is evident that the WCAs of Examples 5 to 9 did not change significantly following sonication. This appears to indicate a strong embedding of the functionalised $Al_2O_3$ hydrophobic particles within the epoxy resin.

Examples 10 to 14

Bonding of the functionalised $Fe_3O_4$ particles and the substrate by an epoxy resin was studied in examples 10 to 14. The substrate was coated with a mixture of the epoxy resin and the functionalised $Fe_3O_4$ particles described in Example 2. In these examples, epoxy resin was added to the functionalised $Fe_3O_4$ particle suspension. Deposition of the mixture onto the substrate was performed through spray coating at ambient temperature, as described previously.

The functionalised $Fe_3O_4$ particle and epoxy resin ratios and the corresponding WCAs for the polymeric films of examples 10 to 14 are summarised in Table 2. Table 2 also shows the WCAs for the polymeric films after they have been sonicated in isopropanol for approximately ten minutes.

TABLE 2

Water contact angle (°) before and after sonication as a function of the ratio of functionalised $Fe_3O_4$ particles and epoxy resin.

| Example | Isostearate functionalised $Fe_3O_4$ particles:epoxy resin | Water contact angle (°) | Water contact angle (°) after sonication |
|---|---|---|---|
| 10 | 11.8:1.0 | 124.3 ± 10.6° | 92.7 ± 8.3° |
| 11 | 6.5:1.0 | 102.1 ± 4.3° | 85.3 ± 14.5° |
| 12 | 2.0:1.0 | 89.9 ± 4.7° | 84.4 ± 5.9° |
| 13 | 1.0:1.0 | 75.4 ± 2.2° | 81.4 ± 3.0° |
| 14 | 1.0:1.5 | 80.7 ± 10.8° | 81.8 ± 2.5° |

When compared with Examples 5 to 9, the WCAs of Examples 10 to 14 are not as high. However, there is a clear trend that the WCA increases when increasing the ratio functionalised $Fe_3O_4$ particles to epoxy resin. Therefore, it is plausible that the WCA could exceed 140° in embodiments where the functionalised $Fe_3O_4$ particle to epoxy resin ratio exceeds 15:1.

In summary, the present invention relates to polymeric films that have improved self-cleaning properties by virtue of attaching hydrophobic particles comprising a metal oxide core having hydrocarbon chains with from 2 to 40 carbon atoms to a substrate, such as a thermoplastic film. It has been found that the surface energy of these polymeric films is very low and non-toxic. Accordingly, the polymeric films can be used in a wide range of applications, including food and liquid packaging. It is also envisaged that the polymeric films can be laminated to a glass, plastics or fabric sheet for improving the hydrophobicity thereof.

It may be useful to tune the WCA at different regions of the polymeric film. In some embodiments, polymeric films may have a first region having an associated WCA measurement and a second region having an associated WCA measurement, whereby the WCA measurements at the first and second regions are different. One way in which this can be achieved is by varying the concentration of hydrophobic particles that are deposited at the first and second regions. For instance, a solution of 4 wt % of $Al_2O_3$ hydrophobic particles may be deposited at the first region and a solution of 2 wt % $Al_2O_3$ hydrophobic particles may be deposited at the second region. Accordingly, the first region will have a high WCA than the second region due to the high concentration of $Al_2O_3$ hydrophobic particles.

As used herein, the term "hydrocarbon chain" is intended to have its usual meaning, i.e. a molecule that consists entirely of hydrogen and carbon.

Representative features are set out in the following clauses, which stand alone or may be combined, in any combination, with one or more features disclosed in the text and/or drawings of the specification.

When used in this specification and claims, the terms "comprises" and "comprising" and variations thereof mean that the specified features, steps or integers are comprised. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

Although certain example embodiments of the invention have been described, the scope of the appended claims is not intended to be limited solely to these embodiments. The claims are to be construed literally, purposively, and/or to encompass equivalents.

The invention claimed is:

1. A polymeric film comprising a substrate at least partially coated with hydrophobic particles, the hydrophobic particles comprising:

an iron oxide core; and a hydrocarbon chain having from 2 to 40 carbon atoms, wherein the hydrocarbon chain is chemically bound to the iron oxide core, the hydrophobic particles and the substrate are secured to one another by an adhesive and wherein the mass ratio of the hydrophobic particles and the adhesive is from 1.0:1.0 to 2.0:1.0, wherein the hydrophobicity of the polymeric film is tuned at different regions across a surface such that a first region of the polymeric film has an associated first water contact angle measurement and a second region of the polymeric film has an associated second water contact angle measurement which differs from the first water contact angle measurement, wherein the first and second regions of the polymeric film are each coated with the hydrophobic particles; and wherein the hydrocarbon chain is covalently bound to the iron oxide core via a functional group, the functional group comprises any one or a combination of: carboxylate, phosphinate, thiolate and/or thiocarboxylate.

2. A polymeric film according to claim 1, wherein the average diameter of the hydrophobic particles is less than or equal to 200 nm.

3. A polymeric film according to claim 2, wherein the average diameter of the hydrophobic particles is less than or equal to 50 nm.

4. A polymeric film according to claim 3, wherein the average diameter of the hydrophobic particles is from 8 nm to 20 nm.

5. A polymeric film according to claim 1, wherein the hydrocarbon chain is aliphatic.

6. A polymeric film according to claim 1, wherein the hydrocarbon chain has from 6 to 24 carbons.

7. A polymeric film according to claim 1, wherein the hydrophobic particles are free from fluorine.

8. A polymeric film according to claim 1, wherein the substrate comprises a thermoplastic film.

9. A polymeric film according to claim 8, wherein the thermoplastic film comprises polyolefin, vinyl polymer or polyacetal film.

10. A polymeric film according to claim 1, wherein the substrate comprises a co-extruded bilayer or multilayer film.

11. A food packaging film comprising a polymeric film according to claim 1.

12. A food or liquid container comprising a surface, wherein a polymeric film according to claim 1 is laminated to the surface.

13. A food or liquid container according to claim 12, wherein the surface comprises metal, alloy, plastics, cardboard and/or glass.

14. A glass sheet having a polymeric film according to claim 1 laminated thereto.

15. A plastics sheet having a polymeric film according to claim 1 laminated thereto.

16. A fabric sheet having a polymeric film according to claim 1 laminated thereto.

17. An article of clothing or footwear having a polymeric film according to claim 1 laminated thereto.

18. A polymeric film comprising a substrate at least partially coated with hydrophobic particles, the hydrophobic particles comprising:

an iron oxide core; and a hydrocarbon chain having from 2 to 40 carbon atoms, wherein the hydrophobicity of the polymeric film is tuned at different regions across a surface such that a first region of the polymeric film has an associated first water contact angle measurement and a second region of the polymeric film has an associated second water contact angle measurement which differs from the first water contact angle measurement, wherein the first and second regions of the polymeric film are each coated with the hydrophobic particles, and wherein the hydrocarbon chain is covalently bound to the iron oxide core via a functional group, wherein the functional group comprises any one or a combination of carboxylate, phosphinate, thiolate and thiocarboxylate.

19. A polymeric film comprising a substrate at least partially coated with hydrophobic particles, the hydrophobic particles comprising:

an iron oxide core;

a hydrocarbon chain having from 2 to 40 carbon atoms, wherein the hydrocarbon chain is covalently bound to the iron oxide core via a functional group, and wherein the functional group comprises any one or a combination of carboxylate, phosphinate, thiolate and thiocarboxylate.

20. A polymeric film according to claim 1, wherein the hydrocarbon chain is branched.

* * * * *